(12) United States Patent  
Zhou

(10) Patent No.: US 11,775,260 B1  
(45) Date of Patent: Oct. 3, 2023

(54) METHOD, APPARATUS, AND DEVICE FOR DAS-BASED CUSTOM FUNCTION EXPANSION, AND STORAGE MEDIUM

(71) Applicant: Tsinghua University, Beijing (CN)

(72) Inventor: Wensheng Zhou, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/090,536

(22) Filed: Dec. 29, 2022

(30) Foreign Application Priority Data

May 17, 2022 (CN) .......................... 202210532723.0

(51) Int. Cl.  
*G06F 8/30* (2018.01)  
*G06F 9/54* (2006.01)  
*G06F 11/36* (2006.01)

(52) U.S. Cl.  
CPC .................. *G06F 8/31* (2013.01); *G06F 9/54* (2013.01); *G06F 11/362* (2013.01)

(58) Field of Classification Search  
CPC ............. G06F 8/31; G06F 9/54; G06F 11/362  
USPC .......................................................... 717/107  
See application file for complete search history.

(56) References Cited

U.S. PATENT DOCUMENTS

| | | | | |
|---|---|---|---|---|
| 9,606,900 B1* | 3/2017 | Pradhan | .................. | G06F 8/427 |
| 2006/0230051 A1* | 10/2006 | Corbett | .................... | G06F 16/29 |
| 2007/0225961 A1* | 9/2007 | Ritts | .................... | G06F 11/3664 |
| | | | | 703/21 |
| 2008/0046807 A1* | 2/2008 | Margitich | ............... | H04L 51/18 |
| | | | | 709/206 |
| 2009/0288073 A1* | 11/2009 | Gosalia | ..................... | G06F 8/33 |
| | | | | 717/141 |
| 2010/0265267 A1* | 10/2010 | Schaepe | ............... | G06V 10/426 |
| | | | | 345/619 |
| 2015/0067697 A1* | 3/2015 | Iizuka | ...................... | G06F 9/52 |
| | | | | 718/106 |

(Continued)

FOREIGN PATENT DOCUMENTS

| CN | 106371931 A | 2/2017 |
|---|---|---|
| CN | 110334169 A | 10/2019 |

OTHER PUBLICATIONS

Wensheng Zhou, A New GeoComputation Pattern and Its Application in Dual-Evaluation, Surveying and Mapping Press, 2021, pp. 3-15.

(Continued)

*Primary Examiner* — Chat C Do  
*Assistant Examiner* — Bradford F Wheaton  
(74) *Attorney, Agent, or Firm* — Bayramoglu Law Offices LLC

(57) ABSTRACT

Embodiments of the present disclosure relate to the technical field of geocomputation, in particular to a method, an apparatus, a device for DAS-based custom function expansion and a storage medium, aiming at realizing that users may add custom functions and expand G-language custom keywords in DAS. The method includes: generating a corresponding target task script file according to a target geographic analysis task; obtaining an interface identification corresponding to the target task script file according to an interface identification setting rule of DAS; generating a corresponding interfacing script file according to the interface identification and the target task script file; and calling the interfacing script file in a calculation-process table of the DAS by a custom keyword, so as to obtain an analysis result of the target geographic analysis task.

15 Claims, 4 Drawing Sheets

(56) References Cited

U.S. PATENT DOCUMENTS

2015/0204973 A1    7/2015   Nohara et al.
2016/0224684 A1*   8/2016   Corlett .................. G06F 40/166
2019/0182352 A1    6/2019   Feijoo et al.

OTHER PUBLICATIONS

Zhou Wensheng, Application of Geodesign Based on DAS in Spatial Planning, Habitat Progress, pp. 32-43.

* cited by examiner

METHOD, APPARATUS, AND DEVICE FOR DAS-BASED CUSTOM FUNCTION EXPANSION, AND STORAGE MEDIUM

CROSS REFERENCE TO THE RELATED APPLICATION

This application claims priority of Chinese application No. 202210532723.0, filed on May 17, 2022, the entire content of which is incorporated herein by reference.

TECHNICAL FIELD

Embodiments of the present disclosure relate to the technical field of geocomputation, in particular to a method, an apparatus, a device for DAS-based custom function expansion and a storage medium.

BACKGROUND

"Document As a System" (DAS) is a brand-new geocomputation model. In this technology, a geographic analysis model is described in a geocomputation language (G language) in the context of MS word or KINGSOFT WPS document processing, so as to form a DAS intelligent document. Then a backend GIS system (such as ArcGIS and QGIS) is driven by the DAS intelligent document to complete geocomputation, which greatly reduces the technical threshold of GIS application and improves the development efficiency of a GIS application system. At present, a G language-integrated development platform DAS2019 has been developed, based on which a series of DAS application systems have been built. In building a geographic analysis model from the G language, keywords of the G language lay in its core, and richness of the keywords determines its breadth and depth of solving problems. The keywords are descriptions of methods for geographic analysis, and different keywords correspond to different function implementations. At present, more than 40 keywords in six classes, including a data acquisition class, a spatial analysis class, a data processing class, an index extraction class, a data expression class and other classes, have been extracted by summarizing common geographic analysis methods, and a corresponding G-language keyword database has been built, and with these keywords, a general geographic analysis model can be built, but due to diversity and complexity of content in geographic analysis, needs of personalized geographic analysis of users cannot be met by only using these keywords. Therefore, it is necessary to expand the keyword database of the G language to enrich functions that the DAS can achieve. In general, updating and expansion of the keyword database of the G language is made by developers, who expand the keyword database of the G language according to newly added functions.

The developers develop new functions and update the G-language corresponding keywords in DAS. This function expansion and keyword maintenance and updating mechanism have great limitations. The users can't expand the new functions and the keyword database according to their own needs, which makes users unable to model, analyze and solve geographic analysis problems that need to be solved urgently by using the DAS because of the limitations of functions and keywords, which reduces user experience and limits popularization of DAS technology.

SUMMARY

A method, an apparatus, a device for DAS-based custom function expansion and a storage medium are provided in embodiments of the present disclosure, aiming at realizing that users may add custom functions and expand G-language custom keywords in DAS.

In a first aspect of the embodiments of the present disclosure, a method for DAS-based custom function expansion is provided, which includes:
  generating a corresponding target task script file according to a target geographic analysis task;
  obtaining an interface identification corresponding to the target task script file according to an interface identification setting rule of DAS;
  generating a corresponding interfacing script file according to the interface identification and the target task script file; and
  calling the interfacing script file in a calculation-process table of the DAS by a custom keyword, so as to obtain an analysis result of the target geographic analysis task.

Optionally, further including:
  generating keyword description data of the target geographic analysis task in a control information column in a calculation-process table according to parameter information in the interfacing script file; and
  generating a hyperlink of input information, a hyperlink of the interfacing script file and a hyperlink of an analysis result in the calculation-process table.

Optionally, generating the corresponding target task script file according to the target geographic analysis task includes:
  determining the target geographic analysis task, and receiving related task parameters of the target geographic analysis task;
  generating a corresponding function script file by script file writing rules according to the related task parameters; and
  debugging the function script file to obtain the target task script file.

Optionally, obtaining the interface identification corresponding to the target task script file according to the interface identification setting rule of DAS includes:
  setting a descriptive information interface identification according to functions of the target task script file;
  setting an input interface identification according to input object information of the target task script file;
  setting an output interface identification according to output object information of the target task script file; and
  setting a control parameter interface identification according to control parameter information of the target task script file.

Optionally, generating the corresponding interfacing script file according to the interface identification and the target task script file includes:
  determining a position of a corresponding character string of the interface identification in the target task script file; and
  replacing the corresponding character string with the interface identification to obtain the interfacing script file.

Optionally, calling the interfacing script file in the calculation-process table of the DAS by the custom keyword, so as to obtain the analysis result of the target geographic analysis task includes:
  determining file information of the target task script file through the control parameters of the custom keyword; and
  calling and executing the interfacing script file according to the file information to obtain the analysis result of the target geographic analysis task.

In a second aspect of the embodiments of the present disclosure, an apparatus for DAS-based custom function expansion is provided, which includes a first script file generation module, an interface identifier setting module, a second script file generation module and a script calling module.

The first script file generation module is configured to generate a corresponding target task script file according to a target geographic analysis task.

The interface identification setting module is configured to obtain an interface identification corresponding to the target task script file according to an interface identification setting rule of DAS.

The second script file generation module is configured to generate a corresponding interfacing script file according to the interface identification and the target task script file.

The script calling module is configured to call the interfacing script file in a calculation-process table of the DAS by a custom keyword, so as to obtain an analysis result of the target geographic analysis task.

Optionally, the apparatus further includes a keyword-description-data generation module and a hyperlink generation module.

The keyword description data generation module is configured to generate keyword description data of the target geographic analysis task in the control information column in the calculation-process table according to parameter information in the interfacing script file.

The hyperlink generation module is configured to generate a hyperlink of input information, a hyperlink of the interfacing script file and a hyperlink of the analysis result in the calculation-process table.

Optionally, the first script file generation module includes a task receiving submodule, a function-script-file generation submodule and a script debugging submodule.

The task receiving submodule is configured to determine the target geographic analysis task, and receive related task parameters of the target geographic analysis task.

The function script file generation submodule is configured to generate a corresponding function script file by script file writing rules according to the related task parameters.

The script debugging submodule is configured to debug the function script file to obtain the target task script file.

Optionally, the interface identification setting module includes a first interface identification setting submodule, a second interface identification setting submodule, a third interface identification setting submodule and a fourth interface identification setting submodule.

The first interface identification setting submodule is configured to set a descriptive information interface identification according to function of the target task script file.

The second interface identification setting submodule is configured to set an input interface identification according to input object information of the target task script file.

The third interface identification setting submodule is configured to set an output interface identification according to output object information of the target task script file.

The fourth interface identification setting submodule is configured to set a control parameter interface identification according to control parameter information of the target task script file.

Optionally, the second script file generation module includes a character string determination submodule and an interfacing-script-file generation submodule.

The character string determination submodule is configured to determine a position of a corresponding character string of the interface identification in the target task script file.

The interfacing script file generation submodule is configured to replace the corresponding character string with the interface identification to obtain the interfacing script file.

Optionally, the script file calling module includes a script information obtaining submodule and a script calling submodule.

The script information obtaining submodule is configured to determine file information of the target task script file through the control parameters of the custom keyword.

The script calling submodule is configured to call and execute the interfacing script file according to the file information to obtain the analysis result of the target geographic analysis task.

In a third aspect of the embodiments of the present disclosure, a readable storage medium with a computer program stored thereon is provided. The computer program, when executed by a processor, implements steps of the method for DAS-based custom function expansion as described in the first aspect of the present disclosure.

In a fourth aspect of the embodiments of the present disclosure, a computer device is further provided, which includes a memory, a processor and a computer program stored on the memory and executable on the processor, and the processor, when executing the computer program, implements steps of the method for DAS-based custom function expansion as described in the first aspect of the present disclosure.

With the method for DAS-based custom function expansion according to the present disclosure, the corresponding target task script file is generated according to the target geographic analysis task; the interface identification corresponding to the target task script file is obtained according to the interface identification setting rule of the DAS; the corresponding interfacing script file is generated according to the interface identification and the target task script file; and the interfacing script file is called in a calculation-process table of the DAS by a custom keyword, so as to obtain the analysis result of the target geographic analysis task. In this disclosure, the target task script file may be generated according to the target geographic analysis task, and corresponding task script files may be compiled according to different geographic analysis tasks, which is applicable to various geographic analysis tasks. A method interface identification of the DAS is provided. When the target task script file is obtained, the corresponding interface identification is generated according to the target task script file, based on setting rules of the method interface identification of the DAS, and then the corresponding interfacing script file is generated, so that user custom functional modules may be called through the DAS, and two-way parameter transfer may be performed, that is, DAS interface information is transferred into the script file and keyword information in the script file is transferred to the calculation-process table of the DAS. Then, through the calculation-process table of the DAS, the interfacing script file is called to get the analysis result of the target geographic analysis task, which enables users to implement personalized geographic analysis tasks based on the DAS, add custom extended functions to the DAS, and enrich custom keywords of the DAS at the same time, thus greatly improving user experience and facilitating popularization of DAS technology.

BRIEF DESCRIPTION OF THE DRAWINGS

In order to explain technical solutions of the embodiments of the present disclosure more clearly, the drawings required in the description of the embodiments of the present disclosure will be briefly introduced below; obviously, the drawings in the following description are only some embodiments of the present disclosure, and other drawings can be obtained according to these drawings by those of ordinary skill in the art without paying creative labor.

DETAILED DESCRIPTION OF THE EMBODIMENTS

In the following, the technical solutions in the embodiment of the present disclosure will be described clearly and completely in connection with the drawings; obviously, the described embodiment is intended to be a part of the embodiment of the present disclosure, but not all of them. On a basis of the embodiments in this disclosure, all other embodiments obtained by the ordinary skilled in the art without any creative effort should be within the protection scope of this disclosure.

The embodiment of the present disclosure is directed to a method for custom function extension and custom keyword extension based on document as a system (DAS). Geocomputation tasks may be performed through a DAS platform. A user custom keyword is set in the DAS, which is an abstract keyword. A specific realize function of the keyword should be realized by a script written according to a specific geocomputation task. Users may get a corresponding function script according to the target geographic analysis task needed to be performed, and realize a corresponding custom function in the DAS, so as to expand the custom keyword.

Figure 1:
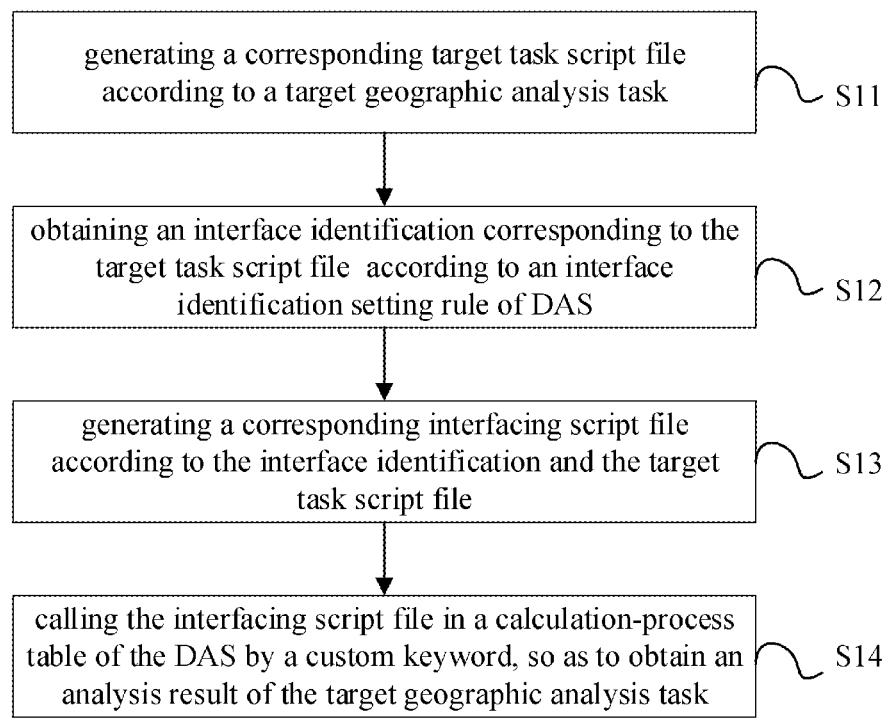
FIG. 1 is a flow chart of a method for DAS-based custom function expansion according to an embodiment of the present disclosure.

Reference is made to FIG. 1, which is a flow chart of a method for DAS-based custom function expansion according to an embodiment of the present disclosure. As shown in FIG. 1, this method includes following steps S11 to S14.

Step S11, generating a corresponding target task script file according to a target geographic analysis task.

In this embodiment, the target geographic analysis task is a geographic-related calculation and analysis task that a user needs to perform, and the target task script file is a segment of executable code written according to the target geographic analysis task.

In this embodiment, firstly, the corresponding target task script file needs to be generated according to the target geographic analysis task, which specifically includes following steps S11-1 to S11-3.

In step S11-1, the target geographic analysis task is determined, and related task parameters of the target geographic analysis task are received.

In this embodiment, when the user needs to perform geocomputation, task description information of the target geographic analysis task is input into a script writing unit, and the script writing unit receives the related parameters of the task.

For example, the target geographic analysis task may be to perform unary linear regression on vegetation coverage of N sampling points in an area and temperature data and draw an analysis diagram. Related parameters of this task are: a task object: drawing a unary linear regression analysis diagram; an input: a data table of vegetation coverage and temperature ("d:\data1.csv" table file); an output: linear regression between the vegetation coverage and the temperature (d:\TJT.jpg); labels of horizontal and vertical axes: "vegetation coverage" and "temperature" respectively; a dot color: blue; and a regression line color: green.

In step S11-2, a corresponding function script file is generated by script file writing rules according to the related task parameters.

In this embodiment, after a script generation unit determines the target geographic analysis task and receives the related task parameters, it may generate the corresponding functional script file according to the script file writing rules.

For example, writing may be made in R language or Python language. The script file writing rules are the same as ordinary script file writing rules, which may be standardized in advance. R language script for drawing a unary linear regression diagram of the vegetation coverage and the temperature is as follows:

Read the file
data=read.csv("d:\data1.csv")
library(ggplot2)
Analyze diagram axis label information
pLab="vegetation coverage, temperature"
Analyze diagram color information
pColor="blue,green"
Processing the axis label information and color information
pLab<-strsplit(pLab,",",fixed=TRUE)
pColor<-strsplit(pColor,",",fixed=TRUE)
Draw an analysis diagram
ggplot(data,aes(x=VALUE1,y=VALUE2))+geom_point
  (pch=17,color=pColor[[1]][1],size=2)+geom_smooth
  (method="lm",color=pColor[[1]][2],linetype=2)+labs
  (title="unary linear regression diagram of vegetation
  coverage and temperature",x=pLab[[1]] [1],
  y=pLab[[1]][2])
Save the analysis diagram
ggsave(file="d:\TJT.jpg")

Referring to Table 1, which is an input data table, the data table includes a vegetation coverage column "VALUE1" and a temperature column "VALUE2", and a column "DIST1" indicates positions of the sampling points.

TABLE 1

|    | A     | B      | C      |
|----|-------|--------|--------|
| 1  | DIST1 | VALUE1 | VALUE2 |
| 2  | 0     | 0.41   | 27.68  |
| 3  | 0.5   | 0.41   | 26.39  |
| 4  | 1     | 0.49   | 28.14  |
| 5  | 1.5   | 0.46   | 29.16  |
| 6  | 2     | 0.6    | 27.18  |
| 7  | 2.5   | 0      | 28.76  |
| 8  | 3     | 0.03   | 32.54  |
| 9  | 3.5   | 0.63   | 27.88  |
| 10 | 4     | 0.63   | 27.56  |

TABLE 1-continued

| | A | B | C |
|---|---|---|---|
| 11 | 4.5 | 0.39 | 27.75 |
| 12 | 5 | 0.41 | 28.21 |
| 13 | 5.5 | 0.28 | 29.14 |
| 14 | 6 | 0.57 | 27.57 |
| 15 | 6.5 | 0.59 | 27.56 |
| 16 | 7 | 0.5 | 27.51 |
| 17 | 7.5 | 0.29 | 28.76 |
| 18 | 8 | 0.47 | 28.42 |
| 19 | 8.5 | 0.01 | 33.33 |
| 20 | 9 | 0.1 | 31.04 |

In step S11-3, the function script file is debugged to obtain the target task script file.

In this embodiment, the target task script file is a script file that runs without error after debugging the function script file.

In this embodiment, the function script file may be debugged by the script debugging unit. When the script runs in error, error codes are modified according to error information until the script file is debugged to be correct, so as to obtain the target task script file.

Step S12, obtaining an interface identification corresponding to the target task script file according to an interface identification setting rule of DAS.

In this embodiment, the interface identification is an identifier of an interface of each column information in a DAS document, and transferring of information and parameters between the functional script and the DAS document may be realized by implanting the interface identification into the script file from the DAS document.

In this embodiment, in order to realize the calling of user custom functions by the DAS and bidirectional transferring of parameters between the DAS and a target task script, interaction between the DAS document and a background system needs to be realized through the calculation-process table in the DAS document. Therefore, information in an input column, information in a control column and information in an output column in the calculation-process table need to be identified.

In this embodiment, the information provided by the input column is a graphic layer or table for processing, which may include one or more graphic layers or data tables. For example, "[IN*]" may be used as an identifier. * represents 1 to N, and N is a number of input terms.

The information provided by the output column is a result of the after-processing of a keyword, including filling a table serial number, a graphic layer and data table. For extension of the user custom functions, only the layer and data table needs to be processed. For example, "[OUT*]" may be used as an identifier, where * represents 1 to N, and N is a number of output items (excluding the table serial number).

The information in the control column includes keyword description data and keyword control parameters, and the keyword description data includes Chinese brief description of the keyword, keyword input and output, and control parameter descriptive information. For example, "#[description]" is used as an identification for the Chinese brief description of the keyword; and "#[keyword]" is used as identifier for the keyword input and output and the control parameter descriptive information. The keyword control parameters describe parameters used when the keyword is called, which are divided by a symbol "|", and respective parameters are identified by [P1],[P2], . . . , [PN] respectively.

Specific steps includes following steps S12-1 to S12-4.

In step S12-1, a descriptive information interface identification is set according to function information of the target task script file.

In this embodiment, the function information refers to a function that may be realized by the target task script. The function information is matched with an interface identification of the Chinese brief description of the keyword according to method interface design rules of the DAS.

For example, for the function script in step S11-1, the descriptive information is: unary linear regression analysis, with an interface identification of "#[description]".

In step S12-2, an input interface identification is set according to input object information of the target task script file.

In this embodiment, the input object information refers to information of the data table or layer input in the script. The input object information is matched with the input interface identification according to the method interface design rules of the DAS.

For example, for the function script in the step S11-1, the input information is a data table file (in a CSV format), denoted by F, with an interface identification of "[IN1]".

In step S12-3, an output interface identification is set according to output object information of the target task script file.

In this embodiment, the output object information refers to information of a processing result output in the script. The output object information is matched with the output interface identification according to the method interface design rules of the DAS.

For example, for the function script in step S11-1, the input information is a picture file (which may include jpg, bmp, emf, pdf or other formats), denoted by F, with an interface identification of "[OUT1]".

In step S12-4, a control parameter interface identification is set according to control parameter information of the target task script file.

In this embodiment, the control parameter information is information of various parameters for controlling the script function. Respective control parameters are matched with the control parameter interface identification according to the method interface design rules of the DAS.

For example, for the function script in step S11-1, the control parameters are: picture name |XName|YName|XLab,YLab|PointColor,LineColor, with interface identifications of [P1], [P2], [P3], [P4] and [P5] respectively.

In this embodiment, corresponding interface identifications are set for function identification information, the input object information, the output object information and the control parameter information in the script by keyword-method interface setting rules of the DAS according to the function script, so that information may be transferred by the DAS according to the interface identifications and various parameters in the script, and corresponding keyword information in the calculation-process table may be filled.

Step S13, generating a corresponding interfacing script file according to the interface identification and the target task script file.

In this embodiment, the interfacing script file is a script file obtained by implanting the interface identification into the target task script file.

In this embodiment, after the interface identification of the functional script is designed according to the interface design rules of the DAS, it is necessary to implant the interface identification into the target task script file, so that parameters may be transferred between the DAS document and the script file through the interface identification.

In this embodiment, generating a corresponding interfacing script file according to the interface identification and the target task script file specifically includes following steps S13-1 to S13-2.

In step S13-1, a position of a corresponding character string of the interface identification in the target task script file is determined.

In step S13-2, the corresponding character string is replaced with the interface identification to obtain the interfacing script file.

In this embodiment, the position of the corresponding character string of the interface identification in the target task script file is determined, and the corresponding character string in the script is replaced with the interface identification involved in step S12 to generate the interfacing script. The generated interfacing script is saved in a specified directory of the DAS, such as the UserModel subdirectory, for the DAS to call.

For example, the interfacing script generated by replacing the corresponding string with the interface identification for the function script in step S11-1 is as follows.

[Description] unary linear regression analysis
[keyword]<F,F>, script name|picture name|XName|Y-Name|XLab,YLab|PointColor,LineColor
Read the file
data=read.csv("[IN1]")
library(ggplot2)
Analyze diagram axis label information
pLab="[P4]"
Analyze diagram color information
pColor="[P5]"
Processing the axis label information and color information
pLab<-strsplit(pLab,",",fixed=TRUE)
pColor<-strsplit(pColor,",",fixed=TRUE)
Draw an analysis diagram
ggplot(data,aes(x=[P2],y=[P3]))+geom_point(pch=17, color=pColor[[1]] [1], size=2)+geom_smooth (method="lm", color=pColor[[1]][2], linetype=2)+labs (title="[P1]",x=pLab[[1]][1],y=pLab[[1]][2])
Save the analysis diagram
ggsave(file="[OUT1]")

Step S14, calling the interfacing script file in a calculation-process table of the DAS by a custom keyword, so as to obtain an analysis result of the target geographic analysis task.

In this embodiment, the calculation-process table of the DAS is used to perform calculation of the target geographic analysis task and output a calculation result.

In this embodiment, the custom keyword is a G-language keyword, but different from other G-language keywords, the keyword is an abstract keyword, that is, a specific realize function of the keyword should be realized by the script corresponding to the target geographic analysis task that the user needs to perform. The keyword is named as KX_MyKeyWord. Control parameters of this keyword are:
 script file|method-interface control-parameter list The script file may be a script written in Python language (with an extension name of py or txt) or a script written in R language (with an extension name of R). The method-interface control-parameter list is an application interface of the script function module. With a series of parameters in the list, the script function may be controlled, and content in the list is determined according to specific content of the script.

In this embodiment, in the DAS calculation-process table, the interfacing script is called by a custom keyword, so that the script is executed to obtain the analysis result of the target geographic analysis task. Specific steps includes following steps S14-1 and S14-2.

In step S14-1: file information of the target task script file is determined through the control parameters of the custom keyword.

In this embodiment, the control parameters of the custom keyword include the file information of the target task script file, including a name of the target task script file and parameters needed to call the script function.

In this embodiment, after the interfacing script file is saved in the specified directory of the DAS, the custom keyword is added in the operation column (the control information column) of the DAS calculation-process table, and the custom keyword includes a script file name and control parameter information. According to the custom keyword, the file information of the script file is determined.

For example, reference is made to Table 2, which is a calculation-process table according to an embodiment of this disclosure. As shown in Table 2, the calculation-process table includes a step column, an operation description column, an input column, an operation column (control information column), an output column and a descriptive column. A user's target geographic task is to perform unary linear regression on vegetation coverage of N sampling points in an area and temperature data and draw an analysis diagram. To realize this function and expand the custom keyword, after the interfacing script file is saved in the specified directory of the DAS, corresponding parameters are entered in the calculation-process table, mainly "vegetation and temperature" are entered in the input column, a custom keyword "KX_MyKeyWord (RModel1/unary linear regression. R| unary linear regression of vegetation coverage and temperature |VALUE1|VALUE2|vegetation coverage, temperature |blue, green)" is entered in the operation column, and "[unary linear regression statistical diagram]TJT.jpg" is entered in the output column. In this way, setup before calling is complete.

TABLE 2

| Step | Operation Description | Input | Operation | Output | Description |
|---|---|---|---|---|---|
| 1 | User custom function | vegetation and temperature | KX_MyKeyWord (RModel1/ unary linear regression. R| unary linear regression of vegetation coverage and temperature |VALUE1|VALUE2| vegetation coverage, temperature |blue, green) | [unary linear regression statistical diagram]TJT.jpg | |

In step S14-2: the interfacing script file is called and executed according to the file information to obtain the analysis result of the target geographic analysis task.

In this embodiment, after the script file information is obtained, the script that needs to be called may be searched in the specified directory of the DAS according to the name of the script file, which may be executed to modify the script, and then the analysis result of the target geographic analysis task, that is, an output analysis table or analysis image, may be obtained after the modified script is executed and processed.

table, in which the Chinese brief description including the keyword, keyword input and output, and the control parameter descriptive information are identified by "#[description]" and "#[keyword]" respectively.

For example, reference is made to Table 3, which is a calculation-process table according to an embodiment of the present disclosure. The operation column (control information column) is automatically filled with [description] customized kinetic energy [unary linear regression] and [keyword]<F, F>, <script name|picture name |XName|YName|XLab,YLab| PointColor,LineColor>.

TABLE 3

| Step | Operation Description | Input | Operation | Output | Description |
|---|---|---|---|---|---|
| 1 | User custom function | vegetation and temperature | [description] customized kinetic energy [unary linear regression] and [keyword] < F, F >, < script name \| picture name \|XName\|YName\|XLab, YLab\| PointColor,LineColor> KX_MyKeyWord (RModel1/ unary linear regression. R\| unary linear regression of vegetation coverage and temperature \|VALUE1\|VALUE2 vegetation coverage, temperature \|blue, green) | [unary linear regression statistical diagram]TJT. jpg | |

Figure 2:
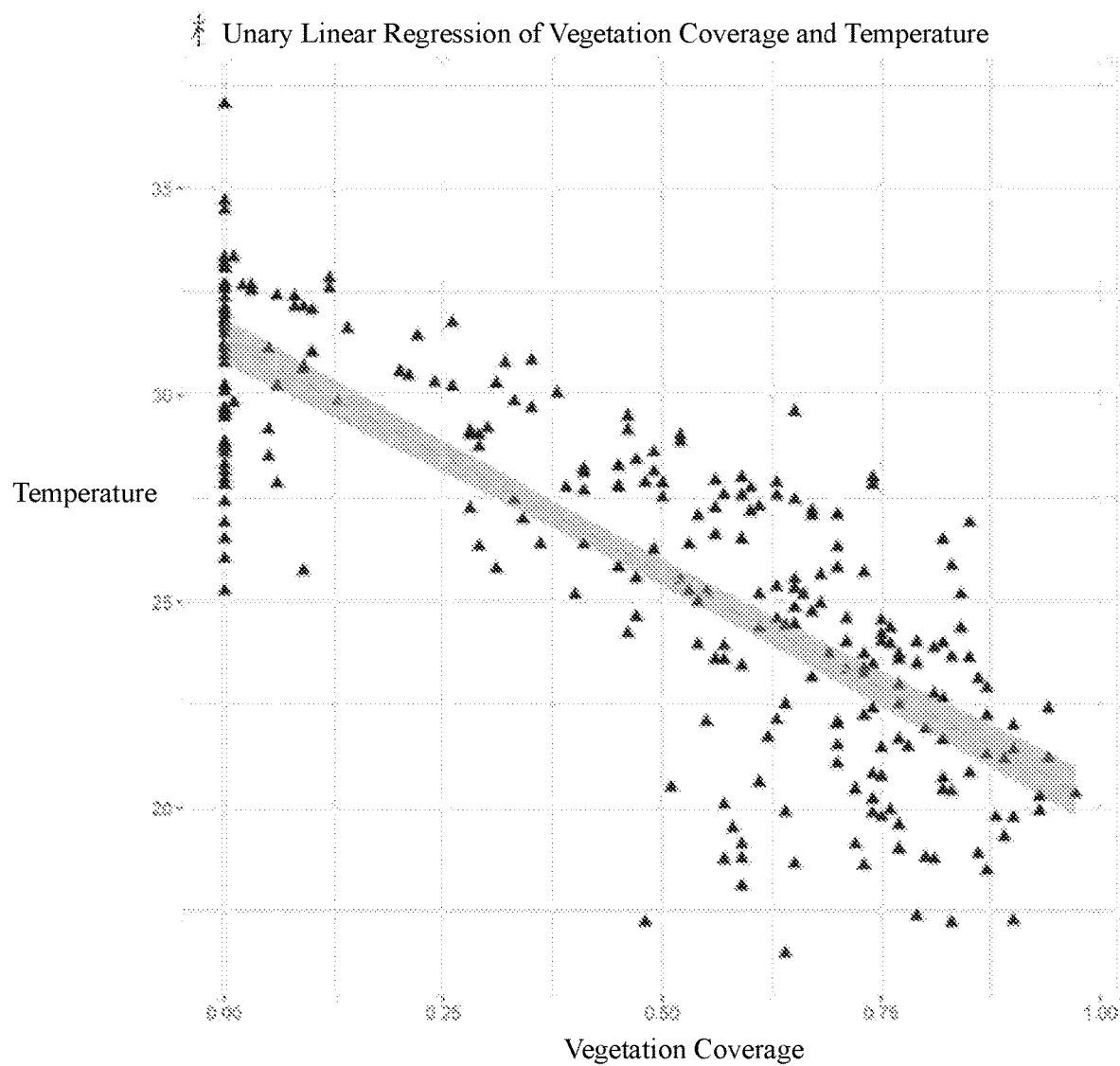
FIG. 2 is an output result diagram according to an embodiment of the present disclosure.
Figure 3:
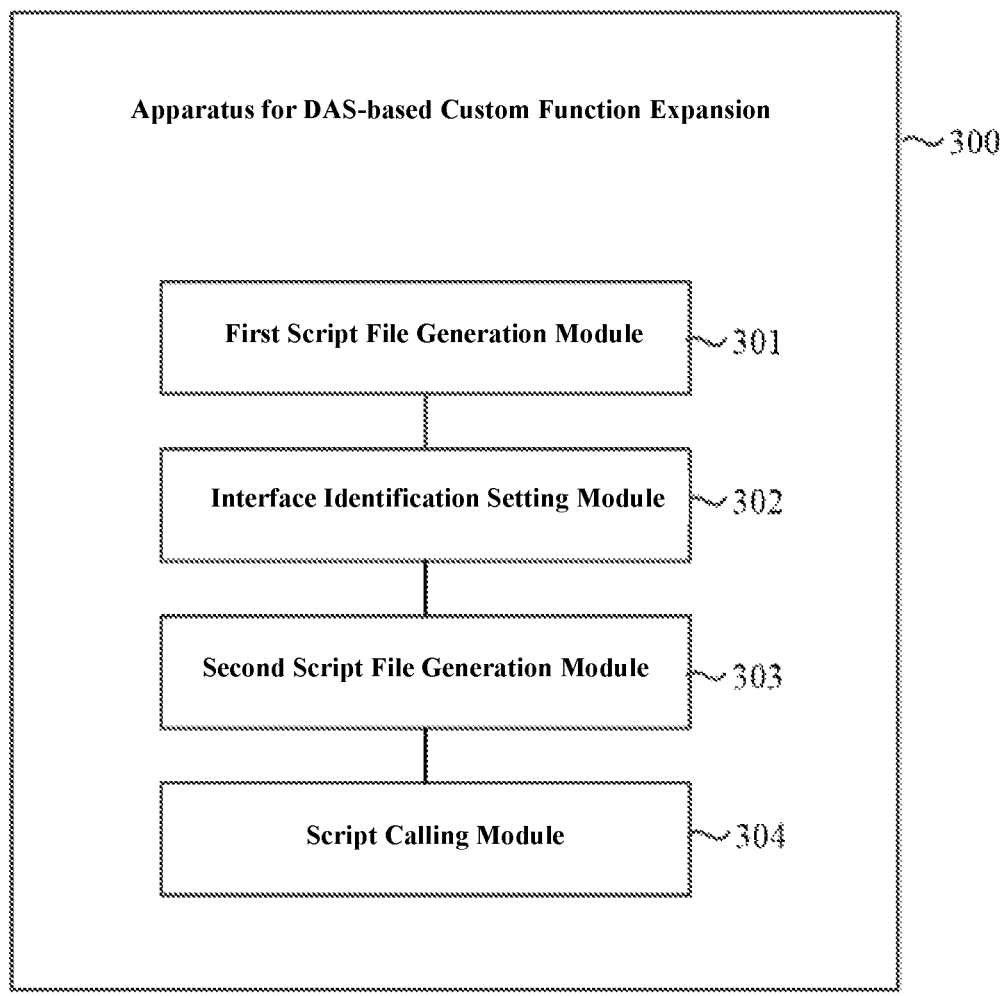
FIG. 3 is a schematic diagram of an apparatus for DAS-based custom function expansion according to an embodiment of the present disclosure.

For example, reference is made to FIG. 2, which is an output result diagram according to an embodiment of the present disclosure, and as shown in FIG. 3, a unary linear regression analysis diagram of the vegetation coverage and the temperature is output for the target geographic task in terms of vegetation coverage and the temperature analysis. A horizontal axis represents the vegetation coverage, a vertical axis represents the temperature, and triangles represent vegetation.

In this embodiment, users may add custom functions in DAS by custom keywords, which may expand the custom keywords, meet personalized geographic analysis needs of the users, greatly promote development of the DAS, and greatly improve breadth and depth of geographic problem analysis, without mastering of complex language and software operations by the users. According to user's target geographic tasks and script writing rules, and then according to interface design rules of the script, functional modules for the DAS to call may be designed, thus improving user experience.

In another embodiment of the present disclosure, the method further includes steps S21 and S22.

In step S21, according to parameter information in the interfacing script file, keyword description data of the target geographic analysis task is filled in the control information column in the calculation-process table.

In this embodiment, when the interfacing script file is called by a system, a script file of a control parameter is the called interfacing script file, and according to the parameter information in the interfacing script file, corresponding parameters may be filled in the control information column in the method interface control parameter list by keyword-method interface design rules. After the script is executed, the target geographic analysis task is completed, and the system will automatically fill the keyword description data in the control information column of the calculation-process In step S22, a hyperlink of input information, a hyperlink of the interfacing script file and a hyperlink of the analysis result are generated in the calculation-process table.

In this embodiment, after the interfacing script is called and executed, the system will generate a hyperlink of input data in the input column of the calculation-process table, a hyperlink of the script file in the operation column, and a hyperlink of an output result in the output column for the users to browse.

For example, reference is made to Table 3. In Table 3, hyperlinks of vegetation and temperature are generated in the input column, a hyperlink of the called script is generated in the operation column (control information column), and a hyperlink of unary linear regression statistics is generated in the output-column, and the users can directly click a corresponding hyperlink for viewing and browsing.

In this embodiment, description information of the keyword and hyperlinks of an input, an output and the script are automatically filled in the calculation-process table, which describes specific functions that the keywords may achieve for the users. The input and output data and the control parameter information enable the users to quickly know the specific functions corresponding to the custom keyword, which is convenient for the users to use. Hyperlinks are further generated, which is convenient for the users to view input and output data and the script, helps the users to master geographic analysis problems more comprehensively, and improves user experience.

Based on the same inventive concept, an apparatus for DAS-based custom function expansion is provided in an embodiment of this disclosure. Reference is made to FIG. 3, which is a schematic diagram of an apparatus 300 for DAS-based custom function expansion according to an embodiment of the present disclosure. As shown in FIG. 3, the apparatus includes a first script file generation module 301, an interface identifier setting module 302, a second script file generation module 303 and a script calling module 304.

The first script file generation module 301 is configured to generate a corresponding target task script file according to a target geographic analysis task.

The interface identification setting module 302 is configured to obtain an interface identification corresponding to the target task script file according to an interface identification setting rule of DAS.

The second script file generation module 303 is configured to generate a corresponding interfacing script file according to the interface identification and the target task script file.

The script calling module 304 is configured to call the interfacing script file in a calculation-process table of the DAS by a custom keyword, so as to obtain an analysis result of the target geographic analysis task.

Optionally, the apparatus further includes a keyword-description-data generation module and a hyperlink generation module.

The keyword description data generation module is configured to generate keyword description data of the target geographic analysis task in the control information column in the calculation-process table according to parameter information in the interfacing script file.

The hyperlink generation module is configured to generate a hyperlink of input information, a hyperlink of the interfacing script file and a hyperlink of the analysis result in the calculation-process table.

Optionally, the first script file generation module includes a task receiving submodule, a function-script-file generation submodule and a script debugging submodule.

The task receiving submodule is configured to determine the target geographic analysis task, and receive related task parameters of the target geographic analysis task.

The function script file generation submodule is configured to generate a corresponding function script file by script file writing rules according to the related task parameters.

The script debugging submodule is configured to debug the function script file to obtain the target task script file.

Optionally, the interface identification setting module includes a first interface identification setting submodule, a second interface identification setting submodule, a third interface identification setting submodule and a fourth interface identification setting submodule.

The first interface identification setting submodule is configured to set a descriptive information interface identification according to function of the target task script file.

The second interface identification setting submodule is configured to set an input interface identification according to input object information of the target task script file.

The third interface identification setting submodule is configured to set an output interface identification according to output object information of the target task script file.

The fourth interface identification setting submodule is configured to set a control parameter interface identification according to control parameter information of the target task script file.

Optionally, the second script file generation module includes a character string determination submodule and an interfacing-script-file generation submodule.

The character string determination submodule is configured to determine a position of a corresponding character string of the interface identification in the target task script file.

The interfacing script file generation submodule is configured to replace the corresponding character string with the interface identification to obtain the interfacing script file.

Optionally, the script file calling module includes a script information obtaining submodule and a script calling submodule.

The script information obtaining submodule is configured to determine file information of the target task script file through the control parameters of the custom keyword.

The script calling submodule is configured to call and execute the interfacing script file according to the file information to obtain the analysis result of the target geographic analysis task.

On a basis of the same inventive concept, a readable storage medium with a computer program stored thereon is provided in another embodiment of the present disclosure. The program, when executed by a processor, implements steps in the method for DAS-based custom function expansion as described in any of the above embodiments of the present disclosure.

Figure 4:
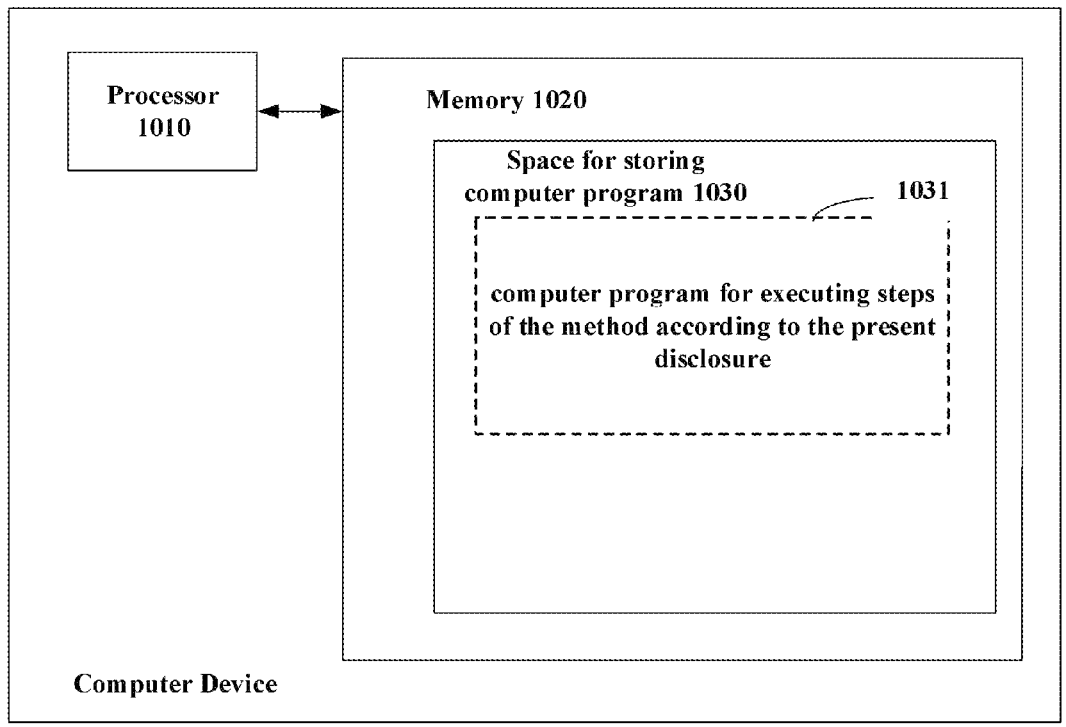
FIG. 4 schematically illustrates a block diagram of an electronic device for performing the method according to the present disclosure.
Figure 5:
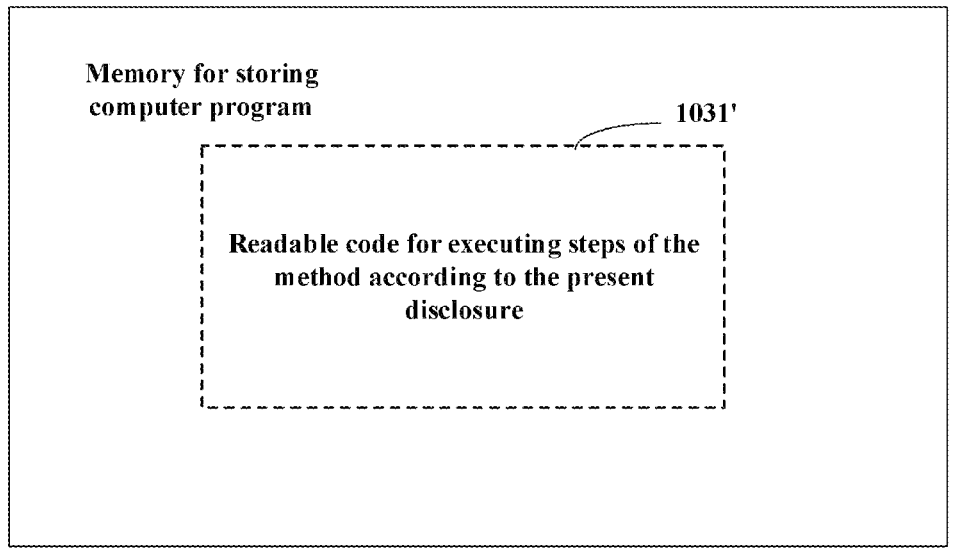
FIG. 5 schematically illustrates a memory cell for maintaining or carrying a program code for implementing the method according to the present disclosure.

On a basis of the same inventive concept, as shown in FIG. 4 and FIG. 5, a computer device is provided in another embodiment of the present disclosure, which includes a memory 1020, a processor 1010 and a computer program 1030 stored on the memory 1020 and executable on the processor 1010, and the processor 1010, when executing the computer program 1030, implements steps in the method for DAS-based custom function expansion as described in any of the above embodiments of the present disclosure.

As for the apparatus embodiment, it is basically similar to the method embodiment, and thus its description is relatively simple, and related aspects can be referred to part of description of the method embodiment.

All the embodiments in this specification are described in a progressive way, and each embodiment focuses on differences from other embodiments. The same and similar parts among the embodiments can be referred to each other.

It should be understood by those skilled in the art that embodiments of the present disclosure may be provided as a method, an apparatus, or a computer program product. Therefore, the present disclosure may be implemented in a hardware embodiment alone, in software embodiment alone, or in an embodiment combining the software with the hardware. Furthermore, the present disclosure may be implemented in the form of a computer program product embodied on one or more computer usable storage media (including but not limited to a disk memory, CD-ROM, an optical memory, etc.) with computer usable program code therein.

The present disclosure is described with reference to a flowchart and/or a block diagram of a method, a terminal device (system), and a computer program product according to the present disclosure. It should be understood that each flow and/or block in the flowchart and/or block diagram, or a combination of flows and/or blocks in the flowchart and/or block diagram can be implemented with computer program instructions. These computer program instructions can be provided to a processor of a general purpose computer, a special purpose computer, an embedded processor or other programmable data processing terminal device to produce a machine, so that instructions executed by the processor of the computer or other programmable data processing terminal device produce means for implementing functions specified in one or more flows in the flowchart and/or in one or more blocks in the block diagram.

These computer program instructions can also be stored in a computer-readable memory that can guide a computer or other programmable data processing terminal devices to operate in a specific way, so that instructions stored in the computer-readable memory produce an article of manufacture including instruction means that implements the functions specified in one or more flows in the flowchart and/or in one or more blocks in the block diagram.

These computer program instructions can also be loaded on a computer or other programmable data processing terminal devices, so that a series of operation steps are executed on the computer or other programmable terminal devices to produce computer-implemented processing, so that the instructions executed on the computer or other programmable terminal devices provide steps for implementing the functions specified in one or more flows in the flowchart and/or in one or more blocks in the block diagram.

Although preferred embodiments of the present disclosure have been described, additional changes and modifications can be made to these embodiments by those skilled in the art once basic inventive concepts are known. Therefore, the appended claims are intended to be interpreted as including the preferred embodiments and all changes and modifications falling within the scope of the present disclosure.

Finally, it should be noted that in this document, relational terms such as "first" and "second" are only used to distinguish one entity or operation from another entity or operation, and do not necessarily require or imply any such actual relationship or sequence among these entities or operations. Moreover, terms "comprising", "including" or any other variation thereof are intended to encompass a non-exclusive inclusion, so that a process, method, article or terminal device including a series of elements includes not only those elements, but also other elements not explicitly listed, or elements inherent to such a process, method, article or terminal device. Without further restrictions, an element defined by the statement "includes a . . . " does not exclude presence of other identical elements in the process, method, article or terminal device including the element.

The method, the apparatus, the device for DAS-based custom function expansion and the storage medium according to the present disclosure are introduced in detail in the above. In this document, specific examples are used to explain principle and implementations of the present disclosure. Explanations of the embodiments described above are only used to facilitate understanding of methods and core ideas of the present disclosure. Meanwhile, changes can be made to the specific implementation and application scope by ordinary skilled in the art according to the ideas of this disclosure. To sum up, contents of this specification should not be construed as limitation to this disclosure.

The invention claimed is:

1. A method for DAS-based custom function expansion, comprising:
   generating a corresponding target task script file according to a target geographic analysis task;
   obtaining an interface identification corresponding to the target task script file according to an interface identification setting rule of DAS;
   generating a corresponding interfacing script file according to the interface identification and the target task script file; and
   calling the interfacing script file in a calculation-process table of the DAS by a custom keyword, so as to obtain an analysis result of the target geographic analysis task;
   wherein the method further comprises:
   generating keyword description data of the target geographic analysis task in a control information column in a calculation-process table according to parameter information in the interfacing script file; and
   generating a hyperlink of input information, a hyperlink of the interfacing script file and a hyperlink of an analysis result in the calculation-process table.

2. The method for DAS-based custom function expansion according to claim 1, wherein generating the corresponding target task script file according to the target geographic analysis task comprises:
   determining the target geographic analysis task, and receiving related task parameters of the target geographic analysis task;
   generating a corresponding function script file by script file writing rules according to the related task parameters; and
   debugging the function script file to obtain the target task script file.

3. The method for DAS-based custom function expansion according to claim 1, wherein obtaining the interface identification corresponding to the target task script file according to the interface identification setting rule of DAS comprises:
   setting a descriptive information interface identification according to functions of the target task script file;
   setting an input interface identification according to input object information of the target task script file;
   setting an output interface identification according to output object information of the target task script file; and
   setting a control parameter interface identification according to control parameter information of the target task script file.

4. The method for DAS-based custom function expansion according to claim 1, wherein generating the corresponding interfacing script file according to the interface identification and the target task script file comprises:
   determining a position of a corresponding character string of the interface identification in the target task script file; and
   replacing the corresponding character string with the interface identification to obtain the interfacing script file.

5. The method for DAS-based custom function expansion according to claim 1, wherein calling the interfacing script file in the calculation-process table of the DAS by the custom keyword, so as to obtain the analysis result of the target geographic analysis task comprises:
   determining file information of the target task script file through control parameters of the custom keyword; and
   calling and executing the interfacing script file according to the file information to obtain the analysis result of the target geographic analysis task.

6. A non-transitory computer-readable storage medium, with a computer program stored thereon, wherein the computer program, when executed by a processor, realizes operations of the method for DAS-based custom function expansion according to claim 1.

7. The non-transitory computer-readable storage medium according to claim 6, wherein generating the corresponding target task script file according to the target geographic analysis task comprises:
   determining the target geographic analysis task, and receiving related task parameters of the target geographic analysis task;
   generating a corresponding function script file by script file writing rules according to the related task parameters; and debugging the function script file to obtain the target task script file.

8. The non-transitory computer-readable storage medium according to claim 6, wherein obtaining the interface identification corresponding to the target task script file according to the interface identification setting rule of DAS comprises:

setting a descriptive information interface identification according to functions of the target task script file;

setting an input interface identification according to input object information of the target task script file;

setting an output interface identification according to output object information of the target task script file; and setting a control parameter interface identification according to control parameter information of the target task script file.

9. The non-transitory computer-readable storage medium according to claim 6, wherein generating the corresponding interfacing script file according to the interface identification and the target task script file comprises:

determining a position of a corresponding character string of the interface identification in the target task script file; and replacing the corresponding character string with the interface identification to obtain the interfacing script file.

10. The non-transitory computer-readable storage medium according to claim 6, wherein calling the interfacing script file in the calculation-process table of the DAS by the custom keyword, so as to obtain the analysis result of the target geographic analysis task comprises:

determining file information of the target task script file through control parameters of the custom keyword; and calling and executing the interfacing script file according to the file information to obtain the analysis result of the target geographic analysis task.

11. A computer device, comprising a memory, a processor and a computer program stored on the memory and executable on the processor, wherein the processor, when executing the computer program, implements operations of the method for DAS-based custom function expansion according to claim 1.

12. The computer device according to claim 11, wherein generating the corresponding target task script file according to the target geographic analysis task comprises:

determining the target geographic analysis task, and receiving related task parameters of the target geographic analysis task;

generating a corresponding function script file by script file writing rules according to the related task parameters; and debugging the function script file to obtain the target task script file.

13. The computer device according to claim 11, wherein obtaining the interface identification corresponding to the target task script file according to the interface identification setting rule of DAS comprises:

setting a descriptive information interface identification according to functions of the target task script file;

setting an input interface identification according to input object information of the target task script file;

setting an output interface identification according to output object information of the target task script file; and setting a control parameter interface identification according to control parameter information of the target task script file.

14. The computer device according to claim 11, wherein generating the corresponding interfacing script file according to the interface identification and the target task script file comprises:

determining a position of a corresponding character string of the interface identification in the target task script file; and replacing the corresponding character string with the interface identification to obtain the interfacing script file.

15. The computer device according to claim 11, wherein calling the interfacing script file in the calculation-process table of the DAS by the custom keyword, so as to obtain the analysis result of the target geographic analysis task comprises:

determining file information of the target task script file through control parameters of the custom keyword; and calling and executing the interfacing script file according to the file information to obtain the analysis result of the target geographic analysis task.

* * * * *